United States Patent Office 2,963,351
Patented Dec. 6, 1960

2,963,351

DETERMINATION OF NITROGEN DIOXIDE

Evelyn C. Stanford, Wilkinsburg, and Charles A. Plantz, Pittsburgh, Pa., assignors to Mine Safety Appliance Company, Pittsburgh, Pa., a corporation of Pennsylvania No Drawing. Original application Apr. 3, 1958, Ser. No. 726,068. Divided and this application Nov. 10, 1959, Ser. No. 851,945

6 Claims. (Cl. 23—232)

This invention relates to the detection and to the quantitative determination of chlorine ($Cl_2$), bromine ($Br_2$) and nitrogen dioxide ($NO_2$) in other gases. These three are sometimes referred to herein as the reactive gas or gases.

An object of the invention is to provide a simple, rapid and reliable method of detecting the presence of the aforesaid halogens and nitrogen dioxide in gases, particularly in air, that may be practiced by unskilled persons, that is satsifactory for plant, field and laboratory use, and that requires only simple, inexpensive and readily available materials and apparatus.

A further object is to provide a method in accordance with the foregoing object that is additionally adapted to the direct quantitative determination of chlorine, bromine and nitrogen dioxide, especially in very low concentrations.

Yet another object is to provide a device for practicing the method of this invention that is light, inexpensive, easily used, adapted to all types of use, and gives satisfactory results in the hands of non-technical personnel.

The invention is predicated upon our discovery that its objects are attained when air or other gas carrying chlorine or bromine is passed through a body of a granular solid that carries N,N,N',N'-tetraphenylbenzidine (TPB) the reagent assumes a blue color, and that the same color change is also applicable to the detection of nitrogen dioxide if the reagent includes a strong acid. When air or other gas to be tested is passed through such a reagent body disposed in a tube of glass or other transparent material that is not affected by the reagent, the presence of the reactive gas causes the development of the blue color along the length of the body of reagent in the direction in which the air is passed, thus affording indication of the presence of the reactive gas. The length over which the blue coloration occurs is dependent, when tested under standard conditions, upon the concentration of reactive gas in the atmosphere tested. Thus we provide for the detection of $Cl_2$, $Br_2$ and $NO_2$ as well as for their quantitative measurement in the case of the reagent embodying a strong acid, and for quantitative measurement of $Cl_2$ and $Br_2$ using the TPB reagent without acid.

The carrier, preferably a granular adsorbent, does not enter into the color producing reaction but serves merely as a chemically inert physical carrier for the reagent. In this way liquid reagents and their attendant disadvantages are avoided. Among the various carriers available silica gel or a mixture of it and sand (preferably white) give satsifactory results, with silica gel alone being preferred. Consequently the invention will be described, by way of illustration, with particular reference thereto.

In accordance with the preferred embodiment of the invention the silica gel, or other adsorbent, is impregnated with TPB together with a strong aqueous acid such, for example, as sulfuric, hydrochloric, perchloric, trichloroacetic or p-toluenesulfonic acids.

As exemplifying this embodiment of the invention, from 0.1 to 300 mg., preferably 0.3 mg., of TPB is mixed with 10 cc. of silica gel and the mixture is heated at 120° C. for 45 minutes. The cooled gel with TPB is then added to from 0.3 to 1.2 cc. of 47% sulfuric acid; most suitably there is first added to the acid 0 to 1.2 cc., preferably 0.6 cc., of water. The mixture is then agitated until it appears dry and is free flowing.

This product is suited, as indicated above for detecting and quantitatively determining $NO_2$, $Cl_2$ and $Br_2$. If only $Cl_2$ or $Br_2$ are to be analyzed for, the acid may be omitted. In this case the gel is treated with TPB as descr:bed above and after the gel has cooled to room temperature, water may be added but in an amount not over about 10 percent by weight of the final mixture.

In the practice of the invention the gas to be tested is passed through a body of the gel. Although this may be done in a variety of ways, it is preferred, especially for field use, to apply it in the general manner described in Patent No. 2,174,349 to John B. Littlefield, i.e., an elongate column, or bed, of the inert granular material carrying the reagent is disposed in a small cross-sectional tube of glass or other inert transparent material, held in place by end plugs of, for example, glass wool or glass tape, and the ends of the tube are then sealed. When a determination is to be made the sealed ends are opened and the air or other gas to be tested is flowed through the tube by any suitable means, as by an aspirator bulb. The presence of the reactive gas in the atmosphere converts the white gel to a blue color promptly.

The reagent gel may tend to develop a blue color on storage but this can be inhibited by including in the tube a preservative, or stabilizer, that acts as an anti-oxidant, i.e., an oxygen absorber. This may be accomplished by disposing a suitable oxygen absorber in the tube before it is sealed. One such agent is alkaline pyrogallol which may be prepared by impregnating silica gel with a strong aqueous solution of pyrogallol and mixing in Ascarite (a caustic soda-asbestos composition). Among other materials that function as stabilizers is manganous oxide. A satisfactory preparation may be made by mixing equal parts by volume of manganous chloride ($MnCl_2$) and lithium hydroxide monohydrate $$(LiOH \cdot H_2O)$$

this mixture must be placed in the tubes immediately after preparation, and it should occupy at least 1 percent but not more than 20 percent of the volume of the reagent gel in the tube. Less than 1 percent does not protect; more than 20 percent changes the calibration where quantitative determination is sought.

In addition to being useful for detecting qualitatively the presence of the aforesaid reactive gases, the invention is applicable also to their quantitative determination. To this end a measured volume of gas to be tested is passed through a tube as just described, and the length over which the blue color is developed affords a direct measure of the concentration of reactive gas. For this purpose the measured volume of air may be supplied in various ways, as by means of an aspirator bulb of known volumetric delivery. By comparing the length over which the coloration occurs with a scale calibrated by the use of the standard volume of different known concentratitons of reactive gas in air there is thus a direct determination.

As indicating the sensitivity of this reagent, it is possible using tubes prepared as described above to detect quantitatively 0.5 p.p.m. by volume of $NO_2$ in air using a 90 ml./minute sample for 5 minutes with a tube of 3.2±0.2 mm. I.D. having a 3-inch length of the impregnated gel containing strong acid. In the case of the TPB gel without acid 0.5 p.p.m. of chlorine can be detected quantitatively using a 2-inch bed of the gel in a tube of the same diameter and a 400 cc./min. sample for 1.5 minutes.

We have discovered also that sensitivity for adequate quantitative use upon prolonged storage is to be had by a simple modification. In this modified embodiment of the invention the reagent is supplied in the form of an ampoule containing a granular adsorbent carrier, such as silica gel, impregnated with sulfuric acid, e.g., 80 cc. of gel and 4.8 cc. of 1:2 $H_2SO_4$, and a second ampoule containing granular inert carrier, such as sand, coated with TPB, e.g., 10 cc. of sand and 30 mg. of TPB. When a test is to be made the contents of the two ampoules are emptied into a bottle which is then closed and shaken so that the two carriers are thoroughly mixed whereby the TPB is distributed over the silica gel particles. Tubes for test purposes are then filled with the mixture, with the determination being carried out as just described. In this embodiment other inert non-adsorbent carriers for the TPB may be used, such, for example, as tiny glass beads, glass powder, talc and the like.

The silica gel should be neither too fine nor too coarse so that the tube will contain an adequately packed body of the reagent without creating too great resistance to flow. We have found that silica gel passing 35 and retained on 60 mesh gives satisfactory results.

N,N'-dimethyl-N,N'-diphenylbenzidine can be substituted for the TPB but with somewhat inferior results. The color of the stain with this reagent is red-violet.

According to the provisions of the patent statutes, we have explained the principle and mode of practicing our invention and have described what we now consider to represent its best embodiment. However, we desire to have it understood that, within the scope of the appended claims the invention may be practiced otherwise than as specifically described.

We claim:

1. That method of determining nitrogen dioxide in a gas which comprises the steps of passing gas to be tested through a body of granular solid carrying a reagent of the group consisting of N,N,N',N'-tetraphenylbenzidine and N,N'-dimethyl-N,N'-diphenylbenzidine together with an acid selected from the group consisting of sulfuric acid, hydrochloric acid, perchloric acid, trichloroacetic acid and p-toluene sulfonic acid, said body being confined within a transparent container and said reagent being changed in color by contact with said nitrogen dioxide.

2. A method according to claim 1, comprising passing a predetermined volume of gas to be tested through an elongate body of said solid, the change of color occurring over a length that is dependent upon the concentration of said nitrogen dioxide, and measuring the length over which the color change occurs.

3. A method according to claim 1, said solid being silica gel carrying per 10 cc. from 0.3 to 300 mg. of N,N,N',N'-tetraphenylbenzidine and from 0.3 to 1.2 cc. of 47 percent sulfuric acid.

4. Means for determining nitrogen dioxide in a gas comprising the combination of a sealed transparent tube, and disposed therein a body of inert granular solid carrying a reagent of the group consisting of N,N,N',N'-tetraphenylbenzidine and N,N'-dimethyl-N,N'-diphenylbenzidine together with an acid selected from the group consisting of sulfuric acid, hydrochloric acid, perchloric acid, trichloroacetic acid and p-toluene sulfonic acid, said body upon passage through the tube, after breaking the seal, of gas carrying nitrogen dioxide, being changed in color.

5. Means according to claim 4, said solid being silica gel carrying per 10 cc. from 0.3 to 300 mg. of N,N,N',N'-tetraphenylbenzidine and from 0.3 to 1.2 cc. of 47 percent sulfuric acid.

6. Means in accordance with claim 4, said sealed transparent tube also including an oxidation inhibitor.

References Cited in the file of this patent

UNITED STATES PATENTS

| | | |
|---|---|---|
| 2,174,349 | Littlefield | Sept. 26, 1939 |
| 2,385,471 | Scharer | Sept. 25, 1945 |
| 2,436,814 | Leitch | Mar. 2, 1948 |

OTHER REFERENCES

Chem. Abstracts 49, 5210i (1955).